US012776530B2

United States Patent
Haavikko et al.

(12) United States Patent
(10) Patent No.: US 12,776,530 B2
(45) Date of Patent: Oct. 27, 2026

(54) THERMAL MANAGEMENT OF A BATTERY MODULE AND OF A BATTERY PACK

(71) Applicant: AURORA POWERTRAINS OY, Rovaniemi (FI)

(72) Inventors: Olli Haavikko, Sinettä (FI); Matti Autioniemi, Rovaniemi (FI); Jori-Jaakko Niskanen, Rovaniemi (FI)

(73) Assignee: AURORA POWERTRAINS OY, Rovaniemi (FI)

( * ) Notice: Subject to any disclaimer, the term of this patent is extended or adjusted under 35 U.S.C. 154(b) by 595 days.

(21) Appl. No.: 18/264,037

(22) PCT Filed: Feb. 2, 2022

(86) PCT No.: PCT/FI2022/050065
§ 371 (c)(1),
(2) Date: Aug. 2, 2023

(87) PCT Pub. No.: WO2022/167726
PCT Pub. Date: Aug. 11, 2022

(65) Prior Publication Data
US 2024/0304887 A1 Sep. 12, 2024

(30) Foreign Application Priority Data
Feb. 3, 2021 (FI) ..................................... 20215114

(51) Int. Cl.
*H01M 10/617* (2014.01)
*B60K 11/02* (2006.01)
(Continued)

(52) U.S. Cl.
CPC ........... *H01M 10/617* (2015.04); *B60K 11/02* (2013.01); *B60L 50/64* (2019.02); *B60L 58/26* (2019.02);
(Continued)

(58) Field of Classification Search
None
See application file for complete search history.

(56) References Cited

U.S. PATENT DOCUMENTS 5,948,298 A 9/1999 Ijaz
9,306,224 B2 4/2016 Von Borck
(Continued)

FOREIGN PATENT DOCUMENTS

CN 102280672 B 7/2014
CN 204424410 U 6/2015
(Continued)

OTHER PUBLICATIONS

Finnish Search Report received for FI Serial No. 20215114 on Sep. 27, 2021, 2 pgs.
(Continued)

*Primary Examiner* — Carlos Barcena
(74) *Attorney, Agent, or Firm* — Merchant & Gould P.C.

(57) ABSTRACT

A thermally controllable battery pack includes a scalable number of battery modules. Each battery module includes a group of horizontally stacked battery cells. Thin metal plate housing surrounds the modules. A thermal fin is placed between some of the adjacent battery cells, so that each battery cell has contact to at least one thermal fin. The thermal fins extend and fold on top of a side edge of the battery cell with 90° angle, so that bent parts of the thermal fins form a substantially planar vertical outer surface. The thermal fins may similarly locate and be bent along the bottom surface. The battery pack includes a foil heater and a thermal pad. A cooling system may include heat exchangers and coolant pipes. A controller and temperature sensor provide thermal management control of the battery pack. The battery pack is used in on-road and off-road electric vehicles.

14 Claims, 7 Drawing Sheets

(51) Int. Cl.

| | |
|---|---|
| ***B60L 50/64*** | (2019.01) |
| ***B60L 58/26*** | (2019.01) |
| ***B60L 58/27*** | (2019.01) |
| ***H01M 10/48*** | (2006.01) |
| ***H01M 10/625*** | (2014.01) |
| ***H01M 10/63*** | (2014.01) |
| ***H01M 10/653*** | (2014.01) |
| ***H01M 10/6551*** | (2014.01) |
| ***H01M 10/6561*** | (2014.01) |
| ***H01M 10/6567*** | (2014.01) |
| ***H01M 50/211*** | (2021.01) |
| ***H01M 50/224*** | (2021.01) |

(52) U.S. Cl.

CPC ........... *B60L 58/27* (2019.02); *H01M 10/482* (2013.01); *H01M 10/486* (2013.01); *H01M 10/625* (2015.04); *H01M 10/63* (2015.04); *H01M 10/653* (2015.04); *H01M 10/6551* (2015.04); *H01M 10/6561* (2015.04); *H01M 10/6567* (2015.04); *H01M 50/211* (2021.01); *H01M 50/224* (2021.01); *H01M 2220/20* (2013.01)

(56) References Cited

U.S. PATENT DOCUMENTS

| | | | | |
|---|---|---|---|---|
| 9,341,688 | B2 | 5/2016 | Schwarz | |
| 10,522,886 | B2 | 12/2019 | Li | |
| 2008/0090137 | A1 * | 4/2008 | Buck .................. | H01M 50/503 429/153 |
| 2012/0188714 | A1 | 7/2012 | Von Borck | |
| 2017/0200991 | A1 | 7/2017 | Nam | |
| 2018/0019508 | A1 | 1/2018 | Lee | |

FOREIGN PATENT DOCUMENTS

| | | | |
|---|---|---|---|
| CN | 204947033 | U | 1/2016 |
| CN | 205159470 | U | 4/2016 |
| CN | 206388796 | U | 8/2017 |
| CN | 208655742 | U | 3/2019 |
| EP | 2608310 | A2 | 6/2013 |
| JP | 5659554 | B2 | 1/2015 |

OTHER PUBLICATIONS

International Search Report and Written Opinion received for PCT Serial No. PCT/FI2022/050065 on Oct. 18, 2022, 9 pgs.

1 Finnish Office Action received for FI Application No. 20215114 on May 23, 2024, 9 pgs.

* cited by examiner

THERMAL MANAGEMENT OF A BATTERY MODULE AND OF A BATTERY PACK

CROSS-REFERENCE TO RELATED APPLICATIONS

This application is a National Stage Application of PCT/FI2022/050065, filed Feb. 2, 2022, which claims benefit of Ser. No. 20/215,114, filed Feb. 3, 2021, in Finland and which applications are incorporated herein by reference. To the extent appropriate, a claim of priority is made to each of the above disclosed applications.

TECHNICAL FIELD

The present invention relates to battery packs applicable in various different uses, concerning on how to maintain the operational temperature of the battery cells in an optimal temperature range. The present invention relates also to application areas of such battery packs, such as electric on-road and off-road vehicles, and various other electric-driven devices, machines and tools.

BACKGROUND

The performance of battery cells and battery packs decreases when the operating temperature decreases towards the freezing temperatures. If the discharging and the charging of the battery is needed to be done in cold temperatures, it will clearly shorten the operational lifetime of the battery cells. Also in lower temperatures, there is a need to restrict the discharge and charge currents; the lower the temperature, the more restriction to these currents is required.

Battery cells in general may have various different chemical compositions, where others endure the temperature changes much more than the rest of these battery types. Also the selection process of the battery cell type in use in electrical on- or off-road vehicles requires not just temperature based properties, but also the operational life of the battery cell, discharge current level, charge current level, operational temperature (or its temporal distribution in various use situations) and of course, the price as well.

Therefore, there is a need to provide the battery pack with a thermal management system or arrangement, which is designed to keep the operational temperature of the battery cells within an optimal level or range. When the thermal management system is in use, it decreases the effect of the actual environmental temperature for the selection process of the battery cell type. It thus broadens the available options of batteries for electrical vehicular use.

Pouch cells have been known since 1995. They comprise conductive foil tabs welded to respective electrodes, sealed in a pouch structure where the positive and negative terminals are carried outside of the pouch. The electrodes can be separated by e.g. insulating foils, and the electrodes can be pressed in a compact manner in a roll-form or in a stack-form to the relatively thin pouch. The basic form of a pouch cell is rather thin, planar piece of plate, where the positive and negative terminals are extruded from one thin edge of the pouch cell, or possibly from opposite edges.

In the following terminology, we define that a battery module comprises several battery cells (like pouch cells). Furthermore, a battery pack comprises a number of battery modules, which can be stacked in X-, Y-, and/or Z-directions.

In prior art, certain heating solutions have been presented in the context of batteries. CN 208655742U ("Li 1") discloses a power battery module, including a battery module casing and a battery module bottom is equipped with a thermal pad and a heating portion, and also it is equipped with a hotting mask in the heating portion. A heat conduction membrane middle part is equipped with a through-hole, and the thermal pad is set up in the through-hole. The arrangement is equipped with a heat conducting layer at the heating device middle part simultaneously. Therefore, an improved heat dispersion of the battery module is obtained.

U.S. Pat. No. 10,522,886 ("Li 2") discloses a battery unit, module and pack. There is a heating film sheet directly or indirectly heating the battery modules. The sheet comprises a heating core and two insulating films. Different modules can be heated with different heating powers, but a single module can be uniformly heated by the sheet-type of a heater.

CN 205159470U ("Chen 1") discloses a battery module, which has an integrated heating and cooling device in the bottom surface of the battery module. FIG. 6 shows an example where heating wire 51 is realized along the bottom surface of the battery module.

CN 204947033U ("Chen 2") discloses a lithium secondary battery module with a heating functionality. The structure resembles Chen 1 a lot, but the main difference is that the heating wire 52 (see FIG. 4) is located along the large vertical surface of the battery module.

CN 204424410U ("Feng") relates to electric heating devices and a battery module using the electric heating devices. Each electric heating device comprises a heating circuit and a front insulating film arranged on the front side of the corresponding heating circuit. The front side face of each front insulating film is fixedly provided with heat conducting plates in an opposite adhering mode, wherein each heat conducting plate is connected with a corresponding battery. The front side face of each front insulating film is fixedly provided with the heat conducting plates in an opposite adhering mode. Heat generated by the heating circuits can be rapidly and evenly conducted by the heat conducting plates, so that the batteries are evenly heated by the heating circuits. The heat conducting plates are directly connected with the batteries, instead of directly connecting the front insulating films with the batteries.

U.S. Pat. No. 9,306,224 ("Von Borck 1") discloses a cooling module and a method of producing it. The cooling module enables also a stackable structure of the battery cells, where the cooling module's sheet metal connection plates 26 form compartments for horizontally aligned battery cells to be inserted horizontally to such compartments.

US 2012/0188714 ("Von Borck 2") discloses a battery management system for a battery module. There is a cooling system in form of cooling plates. Alternatively, bent cooling pipes as shown in FIG. 9 can be used. Air or liquid can act as a coolant.

US 2017/0200991 ("Nam") discloses a cooling device for battery cells including a heat sink with a hollow structure disposed adjacent to at least one side of a battery cell assembly and having a channel formed therein through which a coolant flows. A cooling plate is configured to carry out heat exchange with the battery cells, the cooling plate including a heat absorbing part interposed between the battery cells such that one surface or both surfaces come into contact with the battery cells, and a heat emitting part extending from the heat absorbing part and exposed to the channel, wherein the heat emitting part includes at least one bent surface arranged parallel to the channel, and at least one through-hole through which the coolant goes.

US 2018/0019508 ("Lee") discloses a battery module, which ensures efficient cooling performance, and a battery pack and a vehicle including the battery module. The battery module includes a plurality of pouch-type secondary batteries standing in a vertical direction and arranged in a right and left direction; a plurality of cartridges configured to accommodate the pouch-type secondary batteries in an inner space thereof and stacked in a right and left direction; and a cooling plate made of a thermally conductive material and disposed at a lower portion of the cartridges so that the cartridges are placed thereon, the cooling plate having an upper surface which is at least partially adhered and fixed to the cartridges by means of an adhesive.

U.S. Pat. No. 9,431,688 ("Schwarz") discloses a system and method for use in cold environments in order to heat a high voltage vehicle battery, such as the type commonly found in hybrid vehicles. Some high voltage vehicle batteries-like those based on lithium-ion chemistries-perform better when their battery temperature is in a certain temperature range. Schwarz's battery heating system includes a switch, a battery heater and a high voltage vehicle battery, and initially uses electrical power from an external power source to heat the battery and then uses electrical power from an internal power source to heat the battery. The switch determines which power source is used to heat the battery, and may be dictated by whether the battery heating system is plugged into the external power source and/or a vehicle propulsion system is active.

U.S. Pat. No. 5,948,298 ("Ijaz") discloses a battery heating system for the batteries of an electrical vehicle including a plurality of electrical heaters. The electrical heaters are ap-portioned into a plurality of groups, the groups coupled to independently switchable voltage sources. One or more of the electrical heaters may have a parallel/series design for their resistive heater elements, to improve the reliability of those heaters.

The problem in prior art is that regarding cost efficiency, thermal handling efficiency and the energy density of the battery pack, there is still room for improvement concerning all available prior art above.

SUMMARY

The present invention introduces a thermally controllable battery pack, wherein the thermally controllable battery pack comprises:

- at least one battery module (1), which each comprises a plurality of battery cells (2),
- each battery module (1) is surrounded by a thin metal plate housing (5) on at least three sides of the battery module (1),
- a thermal fin (3) between some of the adjacent battery cells (2), so that each battery cell (2) has contact to at least one thermal fin (3), which thermal fins (3) extend and fold on top of a side edge of the battery cell (2) with 90 degrees angle, so that bent parts of the thermal fins (3) form a substantially planar vertical outer surface with large thermal conductivity for the battery modules (1),
- a foil heater (7) along the bottom surface of the battery module (1), supplied by the battery pack itself or by an external power source,
- a thermal pad between the thin metal plate housing (5) and the bent parts of the thermal fins (3), which thermal pad is made of an electrically insulating material and which is thermally conductive, and
- a controller and at least one temperature sensor, configured to sense the temperature within the battery pack, and to control the temperature of the battery pack by activating and deactivating the foil heaters (7) as desired.

The thermally controllable battery pack is characterized in that:

- the two vertical surfaces of the battery modules (1) comprising the thermal pads are completed with heat exchangers (8),
- the top surface of the battery modules (1) are completed with coolant pipes (9), feeding air or liquid of desired temperature to the heat exchangers (8), and
- the controller is configured to control also the activity of the cooling system for controlling the temperature of the battery pack in case of excessive heat emerges within the battery pack.

Concerning the use of the thermally controllable battery pack, the battery pack may be applied in on-road or off-road electric vehicles, comprising electric cars and electric sleds, or in any other application, where the supplied energy is provided via batteries, or in stationary energy storage systems or rechargeable energy storage systems.

Various different embodiments of the battery pack are disclosed in the detailed description.

DETAILED DESCRIPTION

In the present invention, we discuss thermal management in a battery module level but also in a broader, battery pack level.

First, we discuss how a single battery module is assembled and how its outer housing looks like, in an embodiment of the present invention.

Figure 1:
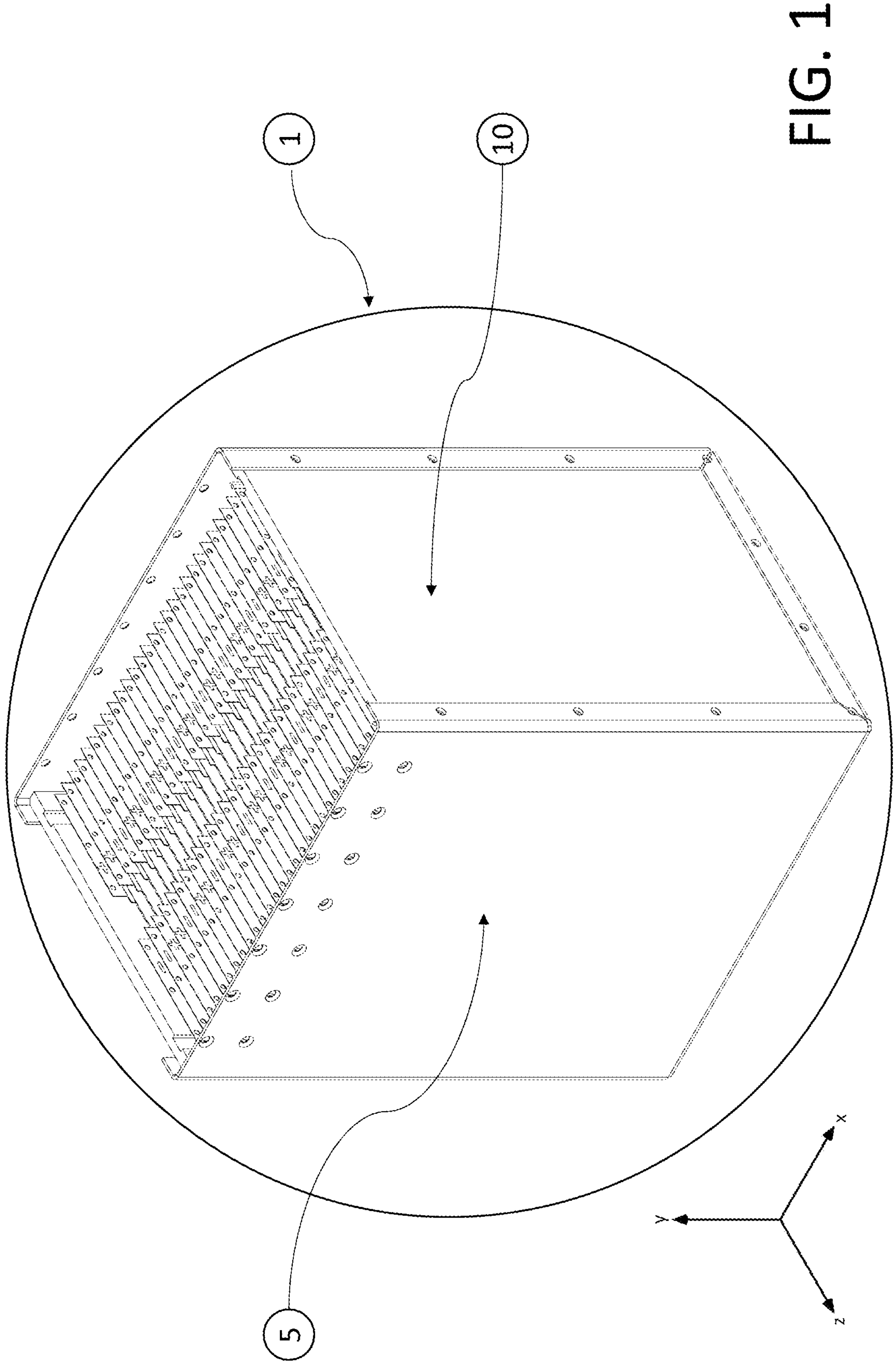
FIG. 1 illustrates an embodiment of a battery module comprising a group of battery cells placed in a vertical direction in a metal housing.

FIG. 1 illustrates an embodiment of a battery module 1 comprising a group of battery cells placed in a vertical direction in a metal housing. FIG. 1 shows the battery module 1, a thin metal plate housing 5, and a thermal pad 6. The housing may be made from a thin metal plate, so therefore, we call it later as a thin metal plate housing 5. The battery module 1 may be formed in a shape of rectangular polyhedron, allowing easier scalability of the battery pack through assembling the battery modules 1 side by side without excessive gaps. The positive and negative terminals (i.e. electrodes) of the battery cells are visible on the top side of each of the battery cells (marked with + and −signs). The thin metal plate housing 5 is also capable to conduct thermal energy as it has a good thermal conductivity. The surface area along the outer surfaces of the battery module 1 is relatively large, and this enables an efficient thermal energy transfer from a heated hot spot to cooler areas. A thermal pad 6 may be placed along the XY-aligned surface of the battery module 1, in its two sides. In an embodiment of the battery pack, ends of the thin metal plate housing 5 may be bent 90 degrees so that these bent edges are connectable to the end plates 10 of the battery module 1 by e.g. screws, welding or other fastening methods, i.e. by selected fastening means.

In an embodiment, the thin metal plate housing 5 surrounds the battery module 1 along all XY- and YZ-aligned end surfaces and the bottom surface as well. Now the thermal pad 6 will locate along the XY-aligned end surfaces so that it locates between the thin metal plate housing 5 and thermal fins 3 (not visible in FIG. 1 because they locate right under the thermal pad 6). In this embodiment, the thermal pad 6 will have good thermal conductivity, but it also will have a poor electric conductivity, in other words, it functions as an electric insulator. Thus, the safety increases with such an insulating layer, which still allows for proper thermal energy transfer between the battery cells' edges and the outer environment of the battery module. The thin metal plate housing 5 enables the proper cooling of the battery cells e.g. by air or liquid, depending on the requirements in various different applications.

Figure 2:
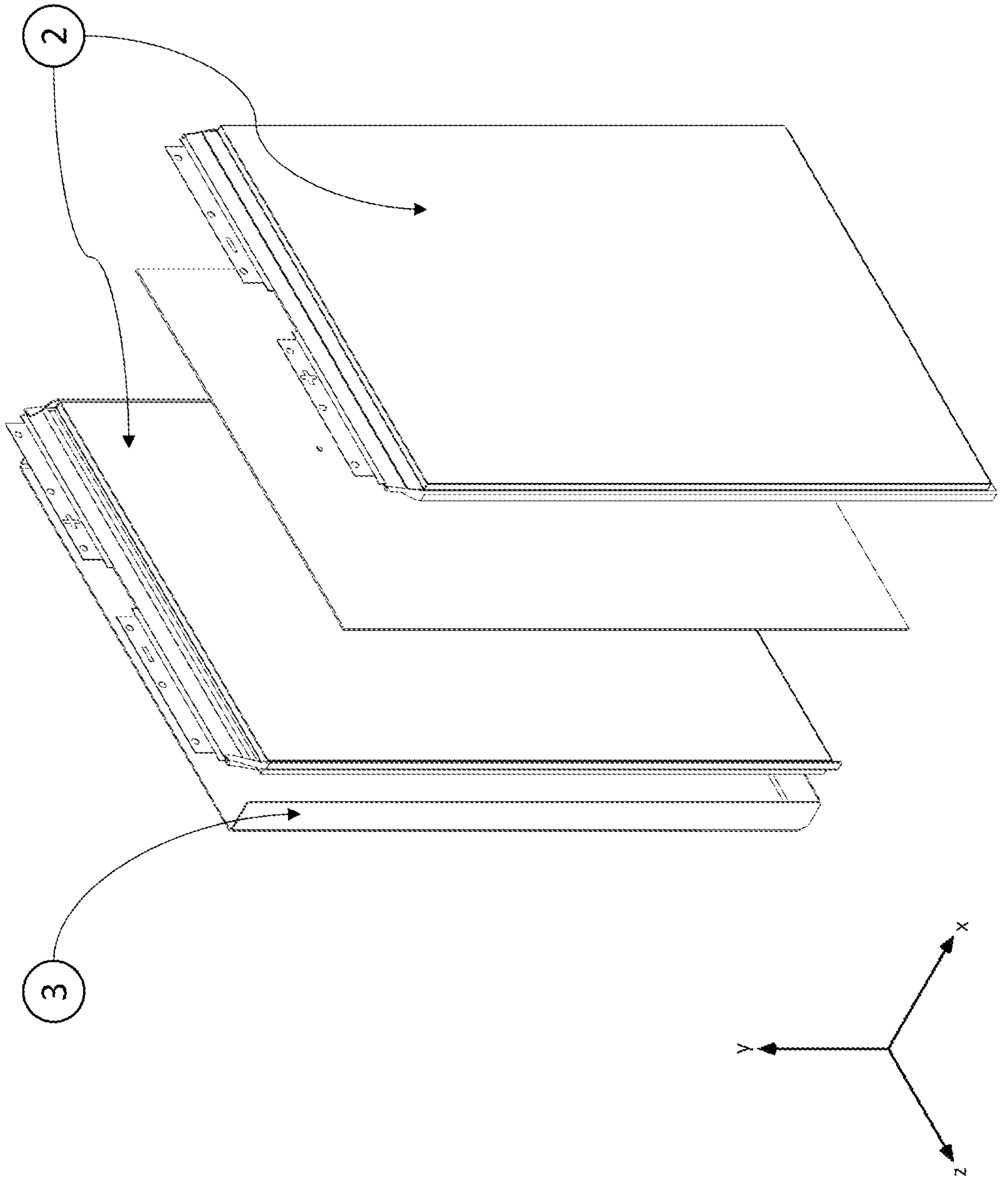
FIG. 2 illustrates two adjacent battery cells and related structural features.

FIG. 2 illustrates two adjacent battery cells and related structural features, in an embodiment of the present invention. The illustration shows two adjacent battery cells 2 which are aligned here in a vertical direction. The coordinate axis system in FIG. 2 is the same as in FIG. 1, and also the same as in the rest of the FIGS. 3-7. The positive and negative terminals are in form of tabs protruding upwards from the battery cell body. For instance, the tabs may locate adjacently (but of course with a mutual gap) on the top edge of the battery cells, but in some other embodiments, it is possible that the tabs locate on some other edge (like the bottom edge), or even that respective (plus and minus) tabs locate on opposite edges of a battery cell.

In between the adjacent cells, there can be a relatively thin piece made of cellular rubber, locating vertically between the vertically aligned cells and having substantially the same size (dimensions) in Y- and Z-directions as the battery cells 2 them-selves. The purpose of the piece made of cellular rubber is to ensure a uniform compression pressure to the large side surface of the respective battery cells 2.

Furthermore, between each adjacent battery cell 2, there is a thermal fin 3, which extends and folds on top of a side edge of the battery cell 2 with 90 degrees angle, the bent parts of the thermal fins 3 forming a substantially planar vertical surface with large thermal conductivity for the battery modules 1. Furthermore, the same thermal fins 3 may also extend and be foldable along a bottom edge of the battery cell 2 with 90 degrees angle as well, where these bent parts of the thermal fins 3 will form a substantially horizontal surface on the bottom surface of the battery module. In other words, at least one side surface of each battery cell 2 will be in contact with a thermal fin 3. Thus, the XY-aligned side surfaces and the bottom surface will be covered (for most parts) with adjacent, bent sections of metal having a large thermal conductivity. These large thermally conductive surfaces will allow an efficient thermal energy transfer from any inner area of the battery module towards the outer surface of the battery module. The thermal fins 3, along the bottom surface of the battery module, may have a contact with a foil heater 7 (not shown in FIG. 2, but it is discussed later). Also a contact to a separate cooling element (system) can be enabled from some parts of the thermal fins 3. Therefore, an efficient heating and cooling possibility is obtained along the thermally conductive metal surfaces of the battery modules 1.

It is notable that usually the hottest part of the battery module 1 is near the terminals i.e. the tabs of the pouch cells. Respectively, usually the coolest part of the battery module 1 is farthest from the terminals. Therefore, it is reasonable to place a foil heater 7 along the bottom surface of the battery module 1, in an embodiment. Respectively, it is reasonable to place a cooling element near the top section of the battery module 1, in an embodiment. As a result, the thermal energy distribution will be relatively uniform within the battery module 1, or at least such uniformity is en-hanced with the presented thermal management system.

Considering the foil heater 7 on the bottom surface of the battery module 1, the outside surface of the foil heater 7 may be insulated so that the radiated heat will propagate into the battery cells 2 and not to ambient environment outside the modules. With a thin, planar foil heater 7, the resulting system will still be optimized regarding the consumed space, and also symmetrical.

In another embodiment, the foil heater 7 may be located on an area, which is part of the other bent sections of the thermal fins 3. This means that the heating process will initiate somewhere on the XY-aligned side edges of the battery module 1.

Furthermore, the foil heater 7 may be supplied by the battery pack or the respective battery module 1 itself, or by an external power source. Concerning the feeding wires of the foil heater 7, they may be located within the end plate 10 of the battery module 1, which leads into another advantage, where the wirings will not increase the outside dimensions of the battery module 1. Thus, the energy density is maximized also in this sense.

Figure 4:
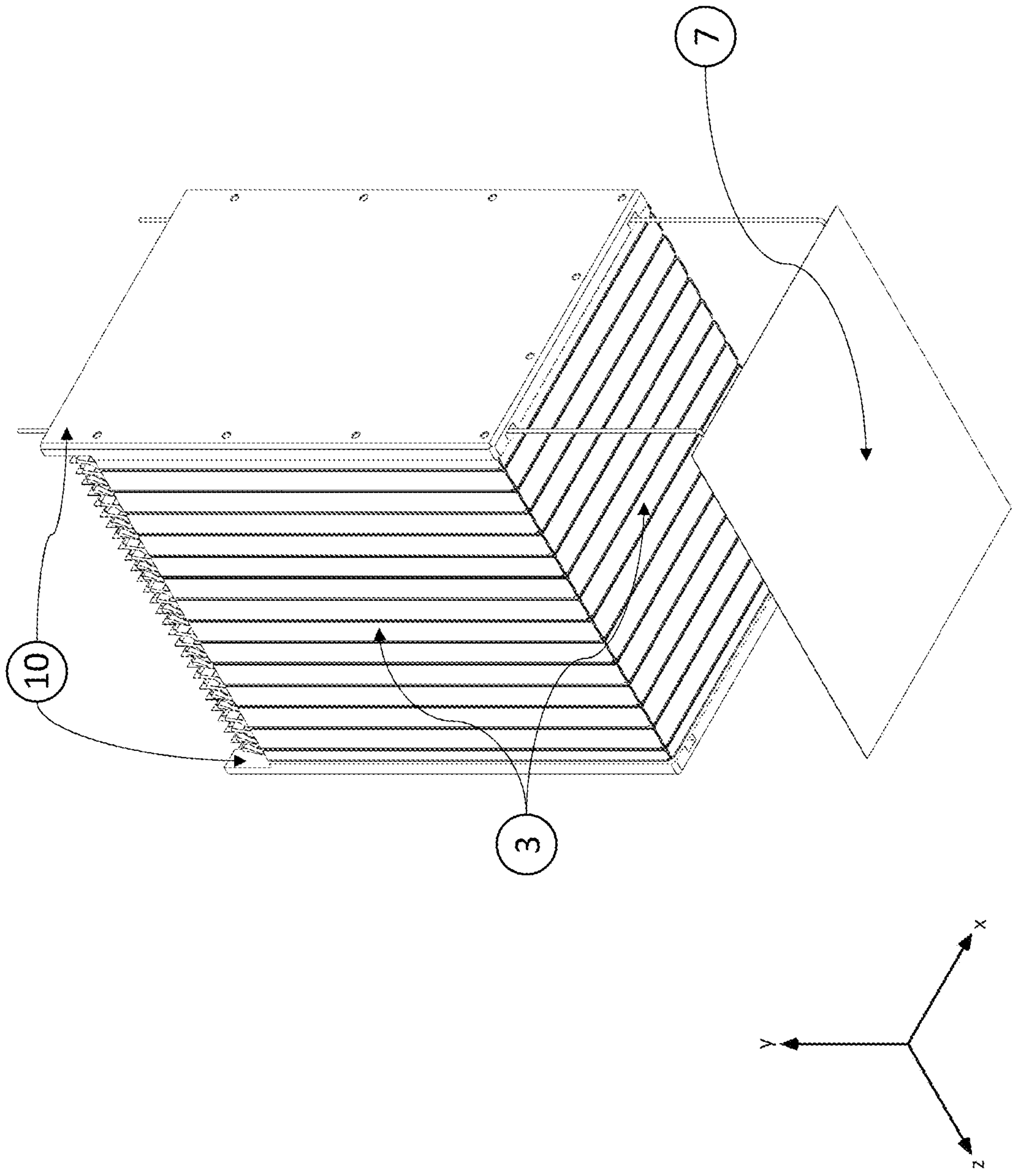
FIG. 4 illustrates the bottom surface of the battery module in more detail.
Figure 5:
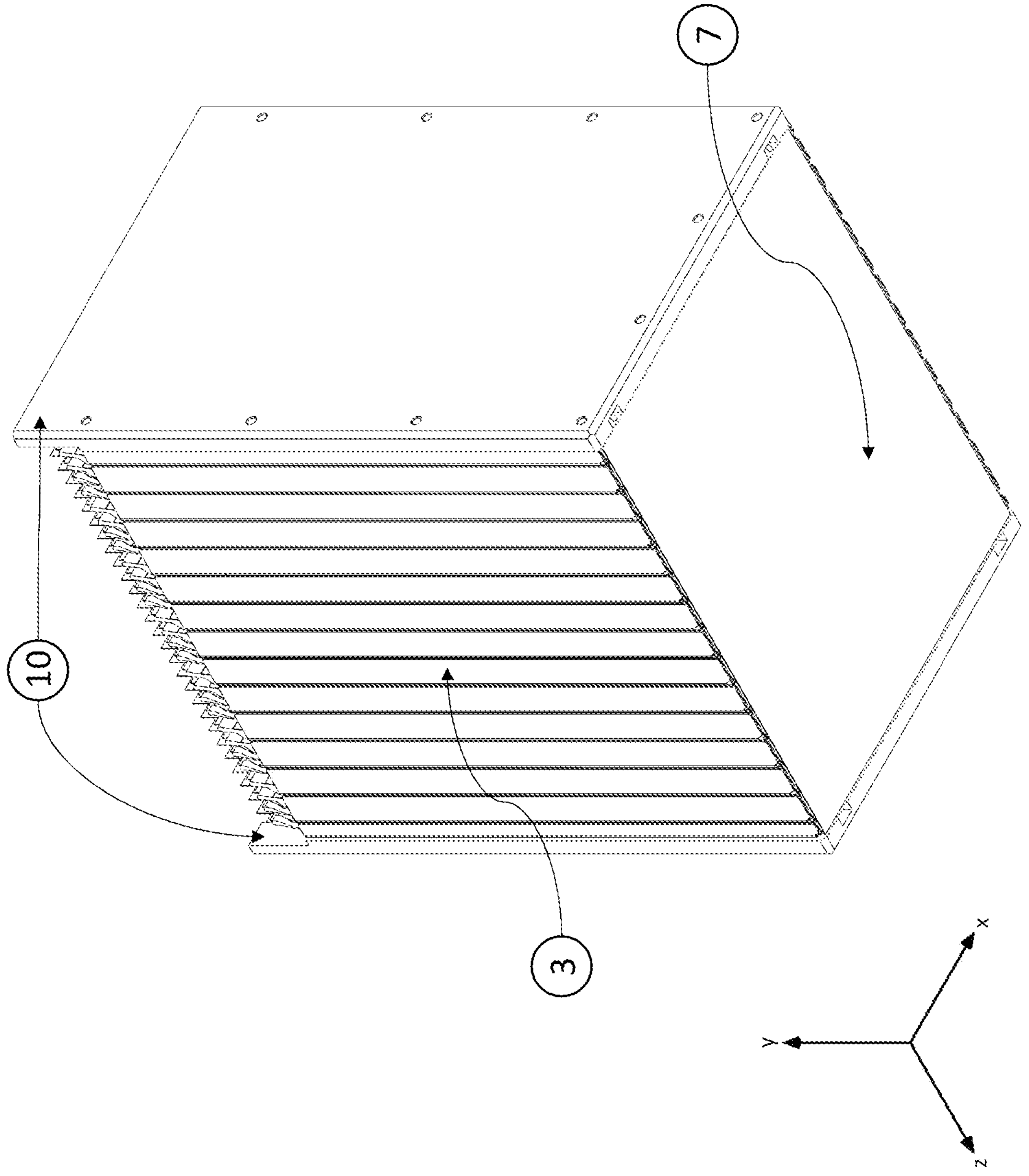
FIG. 5 illustrates a yet another view of the finished battery module.
Figure 6:
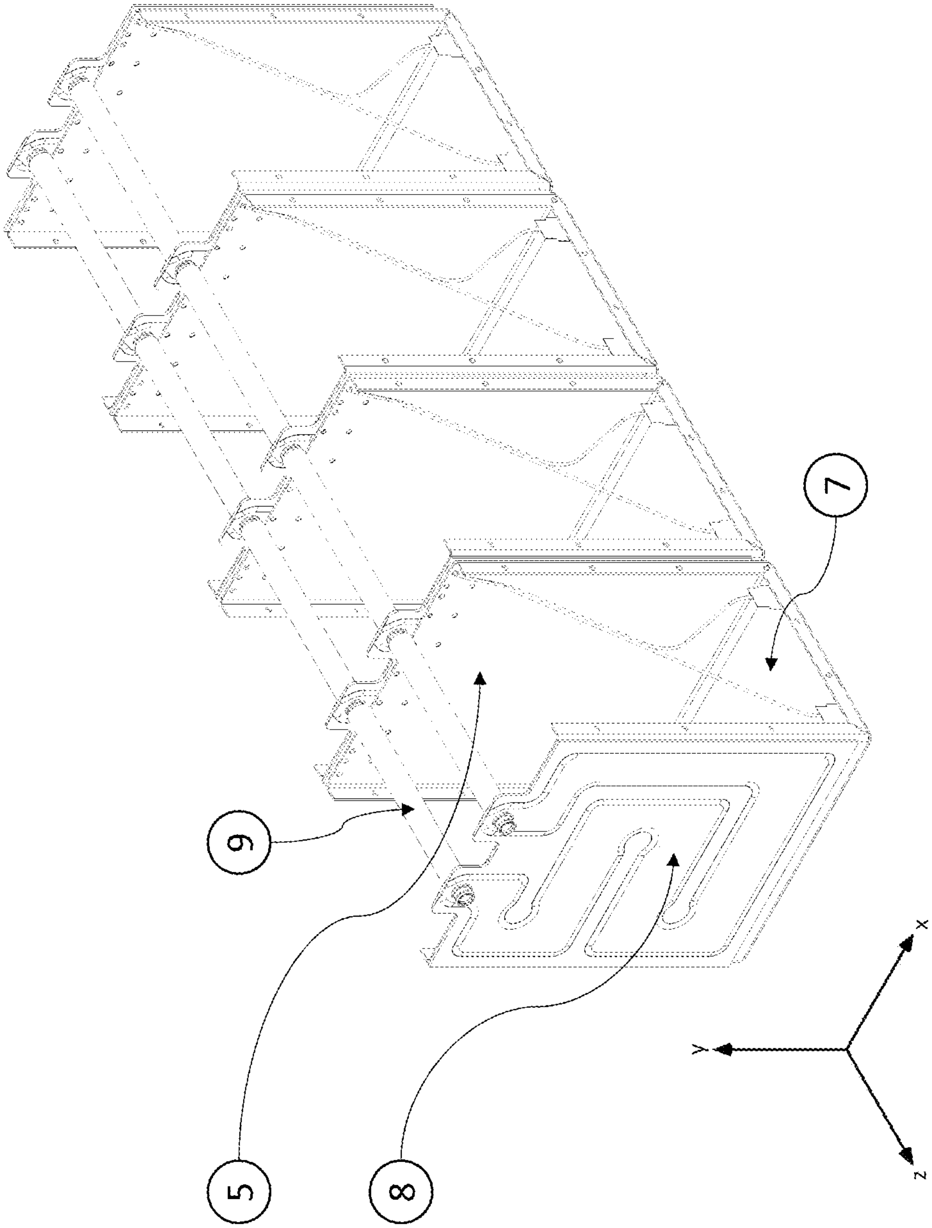
FIG. 6 illustrates four adjacent battery modules and related heat exchangers for the cooling, and heating with foil heaters along the bottom surface of the battery modules.
Figure 7:
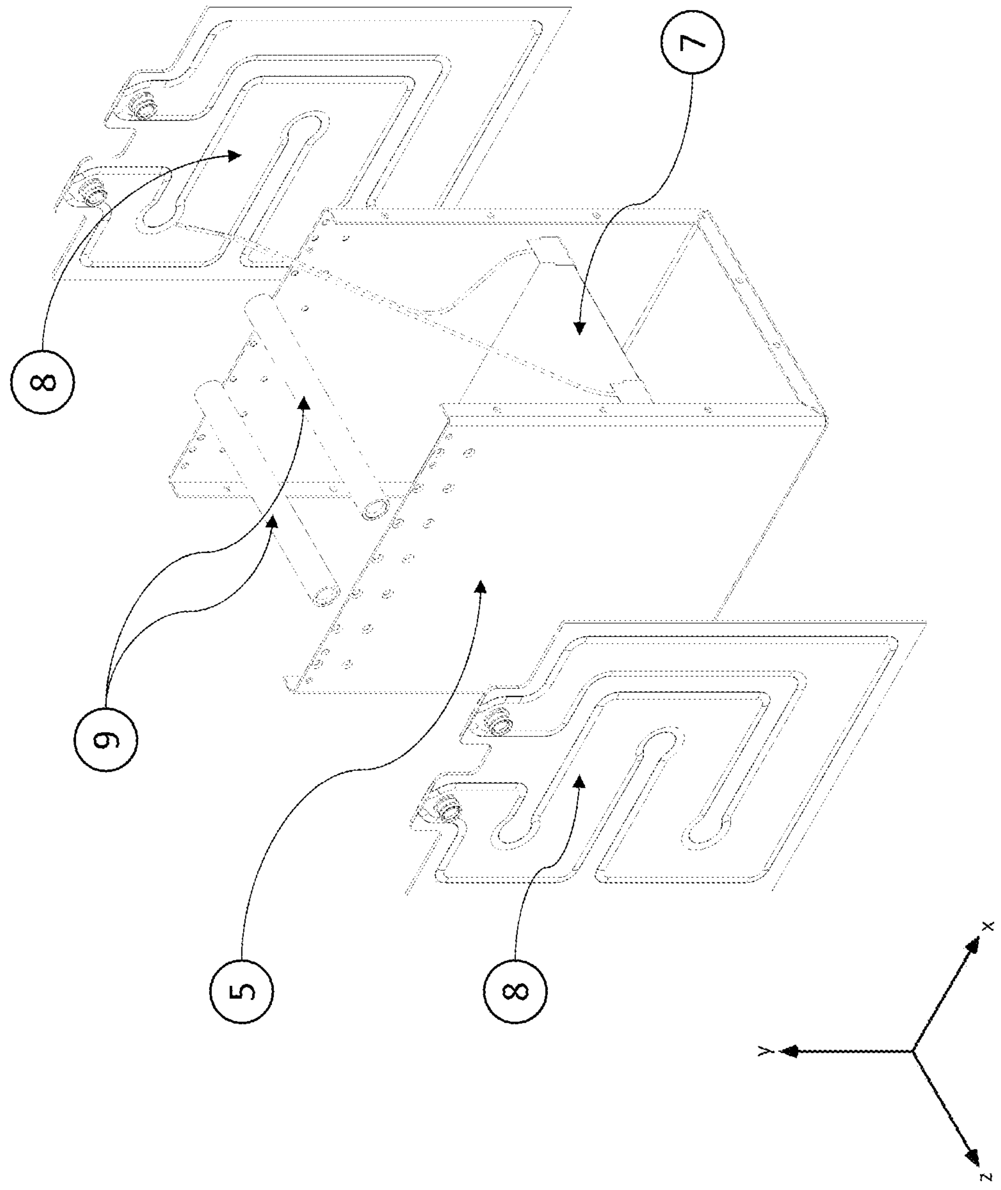
FIG. 7 illustrates another view of a single battery module with heating and cooling functionalities.

FIGS. 3-7 illustrate some of the above elements (such as the foil heater 7) better and also from different angles and views, and especially FIGS. 6-7 also show a cooling system according to an embodiment, which can be installed within a battery pack.

Figure 3:
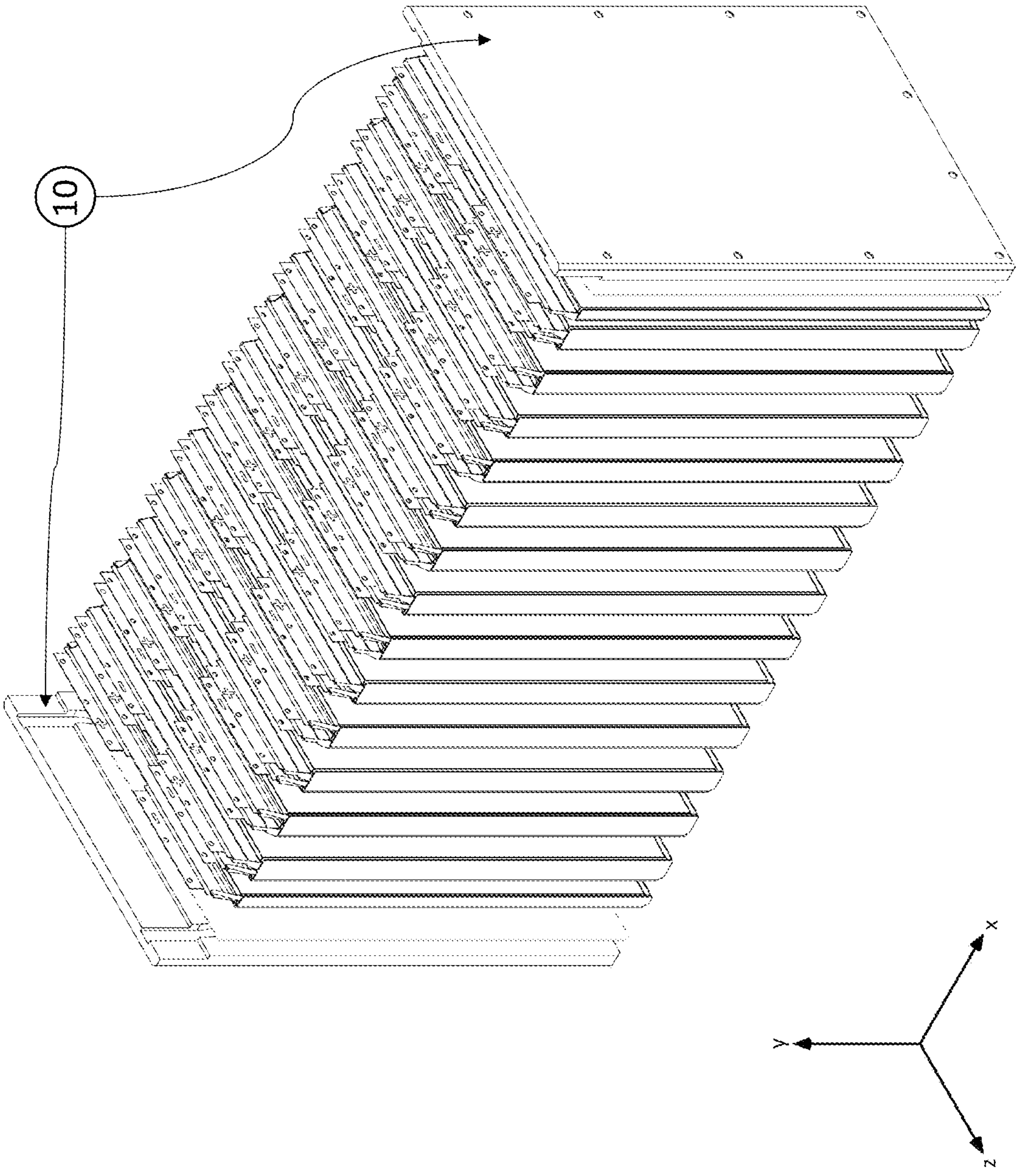
FIG. 3 illustrates a complete set of battery cells within a single battery module with related end plates.

FIG. 3 illustrates a complete set of battery cells 2 within a single battery module 1 with related end plates 10, in an embodiment of the present invention. The thin metal plate housing 5 (discussed earlier in connection with FIG. 1) may be attached to the end plates 10 of the battery module 1 by e.g. screws. The end plates 10 may be made from aluminium. In this example, twenty-eight (28) battery cells are placed adjacently and each in a vertical alignment. The terminals i.e. the tabs may be ordered so that a pair of battery cells comprises the tabs as "plus and minus" or "minus and plus". This pair of reversely oriented battery cells 2 is "enclosed" with a thermal fin 3, which extends and folds on top of a side edge of these two battery cells 2 with 90 degrees angle. These bent sections can be seen as "vertical strips" along the longer side surface of the battery module 1. With this kind of a structure, each battery cell 2 is in connection with at least one thermal fin 3, which has good thermal conductivity properties. It is to be noted in FIG. 3 that the battery cells' locations in the X-axis have been expanded a bit for illustrative purposes, and in the final battery module 1, the "strips" will merge and form a much more uniform surface along the side surface of the battery module 1 (see the following Figures). The housing 5 will also conduct thermal energy well, and it also protects this end of the battery module physically if there is an impulse-typed force affecting the structure along the X-axis.

FIG. 4 illustrates the bottom surface of the battery module 1 in more detail, in an embodiment. Now the shown elements are thermal fins 3, the thin metal plate housing 5, and the foil heater 7 (discussed already earlier). The battery cells 2 are now placed adjacently as in the final product, so therefore the bent parts of the thermal fins 3 form a large and practically uniform heat conducting surface, which reaches the side surface and the bottom surface of the battery module 1. The foil heater 7 is placed on top of the bottom surface of the battery module 1 to ensure that the heat source is close to the usually coolest areas of the battery pack (=far away from the terminals/tabs). The input wirings of the foil heater 7 can be seen to enter and go through the side parts of the end plates 10 in a vertical direction. Thus, these wirings are also protected physically, and because the structure is integrated in this sense, the length of the battery module 1 is not affected when the wirings are "added". The wirings for the foil heater 7 may extend to the next module along the end plate 10, so that the wirings form direct paths where applicable. Now a very compact structure with a proper heating functionality and thermally conducting side surfaces is obtained.

FIG. 5 illustrates a yet another view of the finished battery module. Now the shown elements are thermal fins 3, the thin metal plate housing 5, and the foil heater 7, as in FIG. 4. The battery module 1 structure is now shown as a finally assembled product. Thus, the foil heater 7 is aligned along the bottom surface of the battery module 1. The structure is a compact, rectangularly shaped element, which allows the assembling and stacking of modules in rows, columns and also layers (we mean X-, Y- and Z-directions), without any excessive gaps between the battery modules 1.

Now we proceed to a battery pack which in this example comprises four battery modules placed adjacently in a row. We refer to FIG. 6 in this regard. This example illustrates a group of battery modules 1 assembled together, where a cooling system with plate-like heat exchangers 8 is shown as well. The heating functionality is shown as well in the form of foil heaters 7 along the bottom surface of the battery modules 1. Thin metal plate housing 5 can be seen as well for each of the battery modules 1.

As FIG. 6 shows, the battery pack comprises heat exchangers 8, which can be plate-shaped, and which may locate on XY-planes of the battery modules 1, i.e. between adjacent battery modules in each XY-plane-aligned gap. The plate-shaped heat exchanger 8 may be formed like a curved pipe. If the cross-sectional area within the piping is looked at, it is preferably selected to be as large as possible in view of the module's XY-plane-aligned end wall. As FIG. 6 illustrates, the cross-sectional area of the piping can be selected to be over 50% of the total XY-plane surface of a single battery module. The large cross-sectional area of the piping will make the thermal energy transfer (i.e. the cooling) more efficient. As a generalization for the piping above, the heat exchanger 8 comprises a route for gas or liquid to flow through. The flowing substance can be also called as a coolant. The coolant can be directed to the piping or other kind of route of the heat exchanger 8 via pipes 9. They can also be called as coolant pipes 9. In an embodiment, the pipes 9 may be suitable for circulating water through the heat exchanger 8. Some other coolant may be selected in some other embodiments. The main purpose of the heat exchangers 8 is that the excessive thermal energy created due to chemical reactions inside the battery modules 1 can be conducted off from the battery pack. The pipes 9 may direct water or other coolant to another element which cools water or the coolant once again. After this cooling process outside the battery pack, the same coolant material now having a cooler temperature can be directed once again to the incoming pipes 9 and to the heat exchangers 8. Thus, the heat exchanging system can be made as a closed circulation system, in an embodiment of the present invention.

As visible in FIG. 6, all gaps between the adjacent battery modules 1 along the Z-axis direction can be provided with heat exchangers 8 in an embodiment of the present invention, together with the end surfaces as well (=the end surfaces of the battery modules 1, which are simultaneously also outer surfaces of the whole battery pack). With such a configuration, there are enough thermally conductive paths from various inner sections of the whole battery pack towards the outer side of the battery pack. This ensures proper functioning of the battery pack, as the inner temperature of the battery pack can be well controlled.

In the shown embodiment, the pipes 9 meant for the coolant (inwards and outwards route) may locate along the top horizontal surface of the battery pack. However, some other locations for the pipes 9 are also possible, and the pipes may well have some vertical or curved sections as well, depending on the desired arrangement.

In a preferred embodiment, it is not meant that another layer of battery modules would be placed and pressed against the topmost part of the pipes 9 (=directly from the above). Instead, the gravimetric pressure from the above battery modules (if several layers of battery modules are installed) is meant to be directed onto flat top surfaces of current connectors (not shown). These current connectors are designed to reach to a slightly higher level than the top level of the pipes 9. Thus, the gravimetric force of the above locating battery module(s) will apply to the current connectors, also ensuring better connections in electric sense as well.

The foil heater 7 locates along the bottom surface of the battery module 1 in the finalized product. In an embodiment of the invention, the wirings for the foil heaters 7 may locate along the YZ-planes like shown. This is merely one possible way of placing the wirings along this surface. Still, the wirings are integrated within the housing, which makes them also as physically protected.

Finally, FIG. 7 illustrates another view of a single battery module with heating and cooling functionalities. This is an exploded view during the assembly process of the battery pack. The same elements, as in FIG. 6, are shown; in other words, thin metal plate housing 5, foil heater 7, heat exchangers 8, and (coolant) pipes 9. This exploded view shows that the heat exchangers 8 may be placed between each adjacent battery module 1 in the Z-direction. The exploded view also shows a half-completed situation concerning the instalment of the foil heater 7, as in this view the foil heater 7 is about to be lowered to the bottom surface of the battery module 1. Then the battery cells 2 can be inserted (not shown here), and the rest of the parts as well. The final row of battery modules 1 will look like e.g. in FIG. 6. In FIG. 7 as well, the battery pack to be built will enable one basic functionality relating to efficient thermal energy handling: The heating process will originate from the bottom surface of the battery modules 1, and the cooling process will originate from the XY-surfaces between each adjacent battery module 1. In this way, the battery pack (together with its control logic described elsewhere) is able to handle any created hot spots within the battery structure. The battery pack is also able to handle cold temperatures orig-inating from the ambient environment, where the battery pack is actually used and implemented. In case the environment is wintery weather, as in the usual application areas of electric sleds for instance, the heating application is of utmost importance for the battery packs used in these kinds of vehicles. Of course, these thermal management possibilities allow us to use the battery packs in a variety of different weather conditions. This allows proper outdoor usage for electric devices and electric vehicles. Thus, the service life of the battery pack will be longer and the reliability of the battery pack will clearly enhance in various conditions, when the thermal energy management system according to the present invention is implemented. These are tangible advantages for the present invention.

The present invention also comprises an aspect of applying software, i.e. a com-puter program and respective computer program product for controlling the thermal management of the battery pack. The above disclosed method steps relating to the thermal energy handling of the battery pack and the battery modules as well, can be performed through executing them via a computer program, i.e. program code involving these method steps. The computer program may be executed by a processor or controller or microcontroller, and the piece of software may be stored in a local memory, or in an external location, such as in a cloud service. The com-puter/processor executing the steps may be a microcontroller integrated in the battery pack itself as a small functional entity. The system may comprise also at least one temperature sensor for detecting e.g. in various locations around the battery pack, how the thermal situation behaves. If there is a hotspot arising in certain part of the battery pack, the cooling functionality can be activated by the (micro) controller. Furthermore, if the sensed temperature is below freezing, for instance, the (mi-cro)controller may activate the foil heaters 7.

In other words, there is a controller and at least one temperature sensor, configured to sense the temperature within the battery pack, and to control the temperature of the battery pack by activating and deactivating the foil heaters 7 as desired. Similarly, the controller is configured to control also the activity of the cooling system for controlling the temperature of the battery pack in case of excessive heat emerges within the battery pack, in an embodiment of the present invention.

The thin metal plate housing 5 is one of the elements here, which enables high energy density of the battery modules 1. As the housing 5 is formed by thin and planar elements made e.g. from aluminium, it gives a possibility to place battery modules 1 adjacently without any remaining gaps. Also the length along the X-di-mension for the thin metal plate housing 5 of a single battery module 1 can be freely scaled based on the desired number of battery cells 2 to be placed within a single module. Thus, the modules' lengths in the X-direction may be selected. Whatever the physical size of the single battery module 1, a battery pack may be built by placing battery modules 1 side by side in different directions. Thus, a complete battery pack comprising several battery modules 1 may be created, which has an advantage that the volumetric energy density of the whole battery pack can thus be maximized.

The present invention is suitable for battery pack solutions comprising pouch cell-typed battery cells. The presented heating and cooling options are most advantageous in market areas, where environmental temperatures may vary in a large range, and where the battery pack is prone to excessive internal heating in at least some use situation. The presented thermal management system according to the present invention is cost-efficient, thermally efficient (concerning the speed of the thermal energy transfer), and it enables an energy reserve with a large energy density. This is advantageous in application areas, which have restricted or even "oddly shaped" places available for the batteries. Also the application areas, where there are mass restrictions of the batteries, are applicable with the present invention. And application areas, where thermal energy management is an important issue due to excessive heat due to battery itself combined with possibly climate related reasons; or on the other hand, excessively cold operating circumstances; these are handled well with the thermal management system of the present invention. In practice, suitable application areas are on-road and off-road electric vehicles, such as electric cars and electric sleds. Also any other application, where the supplied energy is provided via batteries, is suitable to be provided with the principle of the present invention. One practical example is formed by stationary energy storage systems or rechargeable energy storage systems.

The present invention is not restricted merely in embodiments disclosed above, but the present invention may vary within the scope of the claims.

The invention claimed is:

1. A thermally controllable battery pack, wherein the thermally controllable battery pack comprises:

at least one battery module, which each comprises a plurality of battery cells, each battery module is surrounded by a metal plate housing on at least three sides of the battery module, a thermal fin between some of the adjacent battery cells, so that each battery cell has contact to at least one thermal fin, the thermal fins extend and fold on top of a side edge of the battery cell at an angle of 90 degrees, so that bent parts of the thermal fins form a substantially planar vertical outer surface with thermal conductivity for the battery modules, a foil heater along a bottom surface of the battery module, supplied by the battery pack or by an external power source, a thermal pad between the metal plate housing and the bent parts of the thermal fins, the thermal pad comprises electrically insulating material and is thermally conductive, a controller and at least one temperature sensor, configured to sense the temperature within the battery pack, and to control the temperature of the battery pack by activating and deactivating the foil heaters as desired, wherein:

two vertical surfaces of the battery modules comprising the thermal pads comprise heat exchangers, a top surface of the battery modules comprises coolant pipes, feeding air or liquid of desired temperature to the heat exchangers, and the controller is configured to control activity of the cooling system for controlling the temperature of the battery pack in case of excessive heat within the battery pack.

2. The thermally controllable battery pack according to claim 1, wherein the battery pack comprises a cooling system so that heat exchangers locate in each gap of adjacent battery modules, and wherein the heat exchanger comprises a curving pathway for liquid or gas in order to cover at least half of a vertical side surface of the battery modules for efficient cooling.

3. The thermally controllable battery pack according to claim 1, wherein the thermal fins extend and fold on top of a bottom edge of the battery cell at an angle of 90 degrees, so that bent parts of the thermal fins form a substantially planar horizontal bottom surface with increased thermal conductivity for the battery modules.

4. The thermally controllable battery pack according to claim 1, wherein the thermal fins are heatable via the foil heater supplied by wirings led via the thin metal plate housing of the battery module in an integrated fashion.

5. The thermally controllable battery pack according to claim 4, wherein the input wirings of the foil heater enter and go through side parts of end plates of the metal plate housing in a vertical direction.

6. The thermally controllable battery pack according to claim 1, wherein terminal tabs of the battery cells locate on a top surface of the battery modules, as upwards pointed protrusions, wherein the battery cells are serially connectable.

7. The thermally controllable battery pack according to claim 1, wherein the battery modules comprise pieces made of cellular rubber locating vertically between the vertically aligned battery cells and having substantially the same size in Y- and Z-directions with the battery cells, to ensure a uniform compression pressure to the large side surfaces of the respective battery cells.

8. The thermally controllable battery pack according to claim 1, wherein the battery modules are formed in a shape of rectangular polyhedron, configured to provide scalability of the battery pack through assembling the battery modules side by side without gaps.

9. The thermally controllable battery pack according to claim 1, wherein ends of the metal plate housing are bent 90 degrees so that the bent edges are connectable to end plates of the battery module by selected fasteners.

10. The thermally controllable battery pack according to claim 1, wherein an outside surface of the foil heater is insulated so that radiated heat will propagate into the battery cells and not to ambient environment outside the battery modules.

11. The thermally controllable battery pack according to claim 1, wherein the foil heaters are located on an area, which is part of another bent, vertical sections of the thermal fins.

12. The thermally controllable battery pack according to claim 1, wherein the heat exchanging system comprises a closed circulation system.

13. The thermally controllable battery pack according to claim 1, wherein all gaps between the adjacent battery modules along the Z-axis direction are provided with heat exchangers, together with the end surfaces of the battery modules, which are simultaneously also outer surfaces of the whole battery pack.

14. A method of using of the thermally controllable battery pack according to claim 1, comprising applying the battery pack in on-road or off-road electric vehicles, comprising electric cars and electric sleds, or using in any other application, where the supplied energy is provided via batteries, or in stationary energy storage systems or rechargeable energy storage systems.

* * * * *